United States Patent
Shea et al.

[11] Patent Number: 5,970,946
[45] Date of Patent: Oct. 26, 1999

[54] NON-ANNULAR PISTON BOWL FOR TWO-VALVE ENGINES USING OFFSET INJECTORS

[76] Inventors: Patrick R. Shea, 870 Driftwood Ave.; Aaron S. Quinton, 7303 E. 50 N.; Nha T. Le, 3800 Williamsburg Ct., Apt. 15A, all of Columbus, Ind. 47203

[21] Appl. No.: 08/972,856

[22] Filed: Nov. 18, 1997

[51] Int. Cl.$^6$ ................................................. F02B 23/08
[52] U.S. Cl. ........................................ 123/276; 123/279
[58] Field of Search ................................. 123/276, 279, 123/193.6, 667; 92/172, 208

[56] References Cited

U.S. PATENT DOCUMENTS

| | | |
|---|---|---|
| 1,803,250 | 5/1931 | Hemmingsen . |
| 2,851,019 | 9/1958 | Fleming et al. . |
| 3,020,898 | 2/1962 | Hartmann . |
| 3,240,190 | 3/1966 | Christian et al. . |
| 3,504,681 | 4/1970 | Winkler ................................. 123/276 |
| 4,036,202 | 7/1977 | Weslake . |
| 4,108,116 | 8/1978 | Ohta ..................................... 123/276 |
| 4,207,843 | 6/1980 | List et al. . |
| 4,428,340 | 1/1984 | Nikly . |
| 4,516,549 | 5/1985 | Brear .................................... 123/276 |
| 4,562,807 | 1/1986 | Matsui . |
| 4,616,612 | 10/1986 | Jane ..................................... 123/276 |
| 4,635,597 | 1/1987 | Ohashi et al. . |
| 4,693,219 | 9/1987 | Burgio .................................. 123/276 |
| 4,793,305 | 12/1988 | Joyce .................................... 123/279 |
| 5,000,144 | 3/1991 | Schweinzer et al. ................. 123/276 |
| 5,158,055 | 10/1992 | Oh et al. ............................... 123/276 |
| 5,215,053 | 6/1993 | Ito ......................................... 123/276 |
| 5,351,665 | 10/1994 | Kapus et al. ......................... 123/276 |
| 5,553,588 | 9/1996 | Gono et al. ........................... 123/276 |
| 5,605,126 | 2/1997 | Hofmann et al. .................... 123/276 |

FOREIGN PATENT DOCUMENTS

| | | |
|---|---|---|
| 1576018 | 5/1970 | Germany . |
| 600687 | 12/1959 | Italy . |
| 0160061 | 10/1984 | Japan . |

OTHER PUBLICATIONS

Rosen, *Automobile Industries*, pp. 38–42, 100, 103–104, Oct. (1952).

*Primary Examiner*—Thomas N. Moulis
*Attorney, Agent, or Firm*—Leydig, Voit & Mayer

[57] ABSTRACT

A piston having an offset piston bowl for use in an engine having a correspondingly offset fuel injector, wherein the piston bowl has a non-circular or non-annular shape. The non-annular bowl shape is contoured to permit increased spray plume length, avoiding impingement. The bowl is especially useful in a diesel engine having two-valves per cylinder, wherein the injector must be mounted in an offset location because a central region of the cylinder head is occupied by two proximal valve ports. The bowl has a raised inner portion surrounded by a concave outer portion. A peak or apex of the raised inner portion is located closer to a peripheral wall of the concave outer portion at a "short" side of the bowl than at a "long" side of the bowl.

18 Claims, 4 Drawing Sheets

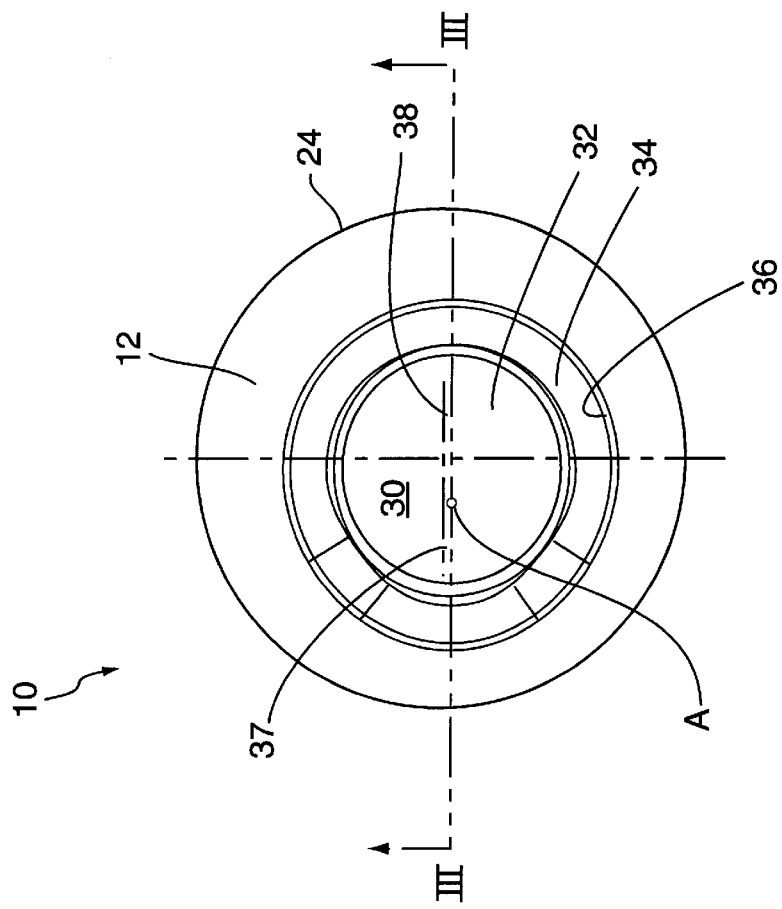
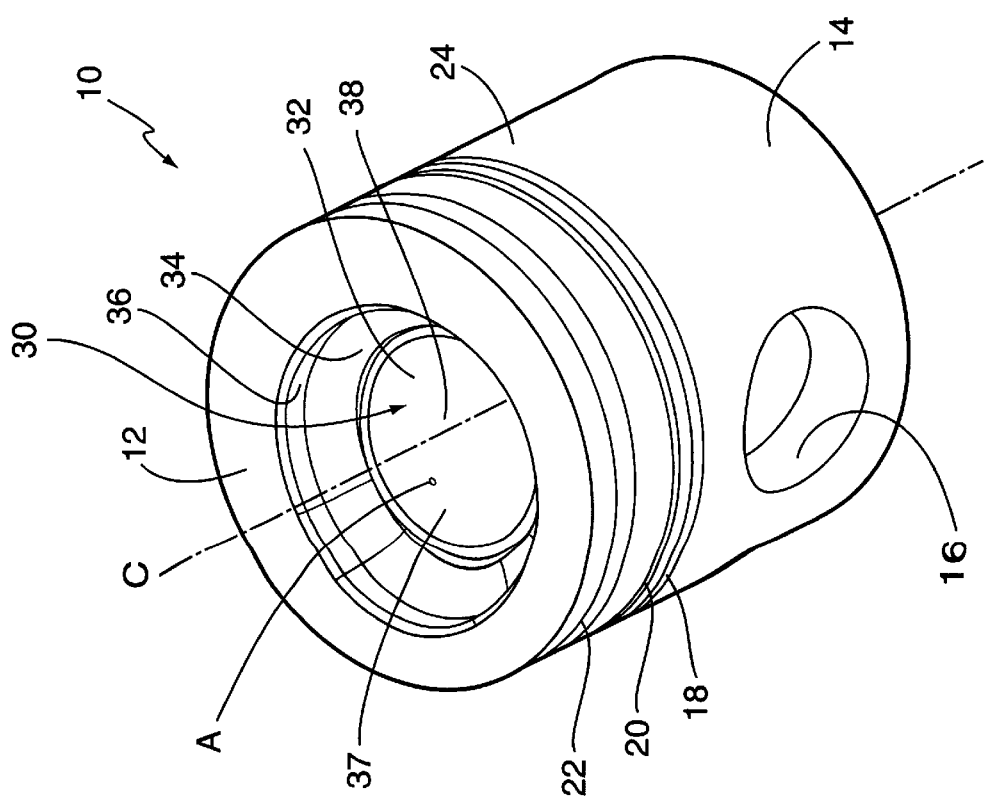

NON-ANNULAR PISTON BOWL FOR TWO-VALVE ENGINES USING OFFSET INJECTORS

BACKGROUND OF THE INVENTION

The present invention generally relates to pistons for internal combustion engines and more particularly relates to a piston bowl formed in the head of a piston for a diesel engine having offset-mounted fuel injectors.

In diesel engines, high compression ratios are reached in the cylinders during a piston compression stroke. Fuel injected into the cylinder during this compression atomizes and combusts, creating a spray plume. Spray plume impingement (contact with a surface of the combustion chamber) is undesirable because it causes improper combustion, resulting in black smoke exhaust. Also, impingement creates extraordinarily high thermal stresses and fatigue on the region of impinged piston material, ultimately causing piston failure. Accordingly, adjacent a fuel injector, a compressed cylinder must provide a volume having suitable size and shape to accommodate the spray plume without impingement. An appropriately designed cylinder volume facilitates complete atomization and combustion of the injected fuel during compression by providing an adequate distance for spray plume travel to prevent impingement.

To provide a suitably shaped combustion volume, a diesel engine piston is conventionally provided with an annular piston bowl or recessed cavity in the piston head. The position and depth of the piston bowl is dictated by factors including the position of the corresponding fuel injector, injection pressures, nozzle configuration, and resulting spray plume size and shape. At the same time, the total volume of a piston bowl is desirably minimized in order to permit high compression.

Piston bowls are conventionally formed by machining the piston with a lathe. By nature, the conventional process of "turning" a piston on a lathe results in a bowl surface which is symmetrical and uniformly shaped around an axis of rotation, thereby resulting in a circular bowl shape described herein as an "annular." A conventional piston bowl is "annular" or circular in cross-section as intersected by a plane parallel to a top of the piston.

A typical fuel injector nozzle tip is configured to inject a plurality of fuel streams which are directed radially-outwardly from the tip. Therefore, a conventional piston bowl is typically formed to include a raised central portion or "apex" or "pip" which fills in space directly under the injector that is not needed to accommodate the spray plumes. The bowl apex is desirably centered on an axis under the fuel injector nozzle because a fuel injector tip injects the fuel (and spray plumes) in a more radial than downward direction.

The development of sophisticated, electronically-controlled, high-pressure fuel injection systems for modern diesel engines has been motivated by increasingly stringent emissions regulations. In order to achieve lower emission levels, fuel system developments have led to higher peak injection pressures as well as a wider range of injection timings. Higher injection pressures result in higher fuel spray velocities within an engine cylinder and, accordingly, increased spray plume penetration distance.

In order to avoid impingement of larger spray plumes on piston surfaces, pistons have been designed with increasingly large piston bowl diameters. By increasing bowl diameter, a greater distance is available to accommodate the larger spray plumes. Ideally, as a result of the increased bowl diameter, a sufficient space is provided for the injected fuel to atomize completely combust before reaching a surface of the combustion chamber, i.e., the piston head.

"Offset" piston bowls are known for use in engines having offset fuel injectors. For example, special bowl design difficulties arise in engines utilizing two-valve cylinder head designs (i.e., one intake valve, and one exhaust valve). In order to desirably maximize valve port areas in a two-valve cylinder head, geometry constraints dictate that the intake and exhaust ports extend closely toward each other, substantially occupying the center of the cylinder bore. The fuel injector must, therefore, be mounted in an offset-from-center location. Because the piston bowl is ideally centered under the offset injector nozzle tip, the piston bowl is correspondingly offset as well. Known "offset" piston bowls are annular in shape, and offset bowls are typically formed by "turning" the piston on a lathe along an offset axis.

In engines with offset injectors, a diameter of the annular offset piston bowl has been increased to accommodate increasing spray plume distances for the reasons explained above. Unfortunately, the proximity of the bowl surface to a side of the piston is limited by the structural limits of the piston, restricting the size of a possible annular bowl diameter. Too thin of a piston structure at some point near the bowl could result in piston failure from stress and fatigue. Thus, the diameter of a conventional offset piston bowl is limited so that the piston limits are not exceeded.

In an attempt to accommodate greater spray plume distances, "partially offset" bowl designs have been attempted in an offset piston bowl has an increased diameter, but wherein the bowl position is compromised as being offset relative to the center of the piston, but not optimally centered under the injector either. This unfortunately results in an position of the bowl apex which is offset relative to the injector (the apex is not centrally aligned with the aim of the injector), resulting in impingement on the apex.

SUMMARY OF THE INVENTION

An object of the invention is to provide an improved shape for a piston bowl that allows increased plume penetration distance in an engine with offset injectors. A related object is to provide a piston bowl having a shape that reduces impingement.

The present invention provides an improved piston having a piston bowl shaped to provide increased plume penetration distance, resulting in reduced impingement. According to the invention, the piston bowl is a non-circular or non-annular in shape. This non-annular shape of the piston bowl permits optimal spray plume penetration distances with a maximum offset of the bowl volume. The non-annular bowl surface permits greater design flexibility to accommodate spray plume distances, without the constraints and performance disadvantages of the conventional annular geometry of an offset bowl. A bowl according to the invention is preferably shaped with a surface contour that provides a maximum penetration distance possible on the "short side" (a side of the bowl which most closely approaches the side of the piston) within the material design limits of the piston, while a remainder of the bowl surface contour extending around an opposite "long" side is appropriately shaped to accommodate spray plume penetration distances of desired lengths.

The non-annular shape of the bowl also allows the apex (a high point of a raised inner portion of the bowl) to be optimally non-annularly shaped and positioned under the nozzle tip in order to avoid impingement against the apex. This eliminates the aforementioned problems with apex spray impingement commonly experienced with a conventionally-offset annular bowl wherein the bowl-centered apex had not been optimally positioned under the injector tip, but rather was offset from the injector tip.

The non-annular bowl contour of the invention is preferably achieved by shaping a region at the "short" side like that of a fully-offset conventionally annular bowl which is as close to the side of the piston as material design limits will permit, considering all of the piston's structural features such as a circumferential recess for a ring insert. At regions of the bowl away from the "short" side, beyond a point at which the bowl dimensions are constrained by the structural limits of the piston, the bowl with an increased size and outer dimension in comparison to that of a conventional offset bowl. So that the bowl is smoothly shaped, the sides of the apex form tangents with the radium at a base of the bowls outer wall and the apex peak.

Additionally, the injector tip is preferably selected or designed in conjunction with the bowl to include nozzle holes which generate spray plumes of a length correspondingly within the shape of the bowl. The injector tip is preferably further designed to direct the respective spray plumes toward similar vertical heights on an outside wall of the bowl.

Technical developments in machining have made it possible to machine a piston bowl in such a non-annular shape. In particular, computer aided machining "CAM") processes, such as computerized numerical control ("CNC") milling, facilitates the machining of a non-annular piston bowl in a cost-effective manner.

An advantage of the present invention is to provide a piston bowl shape which maximizes the available overall spray plume penetration distance for offset injector diesel engine designs. The non-annular piston bowl shape is especially advantageous in an engine having two valves per cylinder (or another engine having offset injectors) to effectively utilize high injection pressure electronic fuel systems, resulting in improved emissions and performance, and extending engine life. Additionally, the present invention provides a low-cost alternative to a four-valve head design without impingement problems previously incurred with engines having two-valve head designs. The increased penetration distance provides adequate plume travel distance for complete atomization, resulting in improved smoke control and reduced hydrocarbon emissions. $BSNO_X$ reductions will be derived from the lower injection pressure requirements as well as reduced air motion in the bowl.

Additional features and advantages of the present invention are described in, and will be apparent from, the disclosure herein and from the drawings.

BRIEF DESCRIPTION OF THE DRAWINGS

FIG. 1 is a perspective view of a piston having a non-circular or non-annular piston bowl according to the invention.

FIG. 2 is a plane view of the piston of FIG. 1

DETAILED DESCRIPTION OF THE PREFERRED EMBODIMENTS

Figure 3:
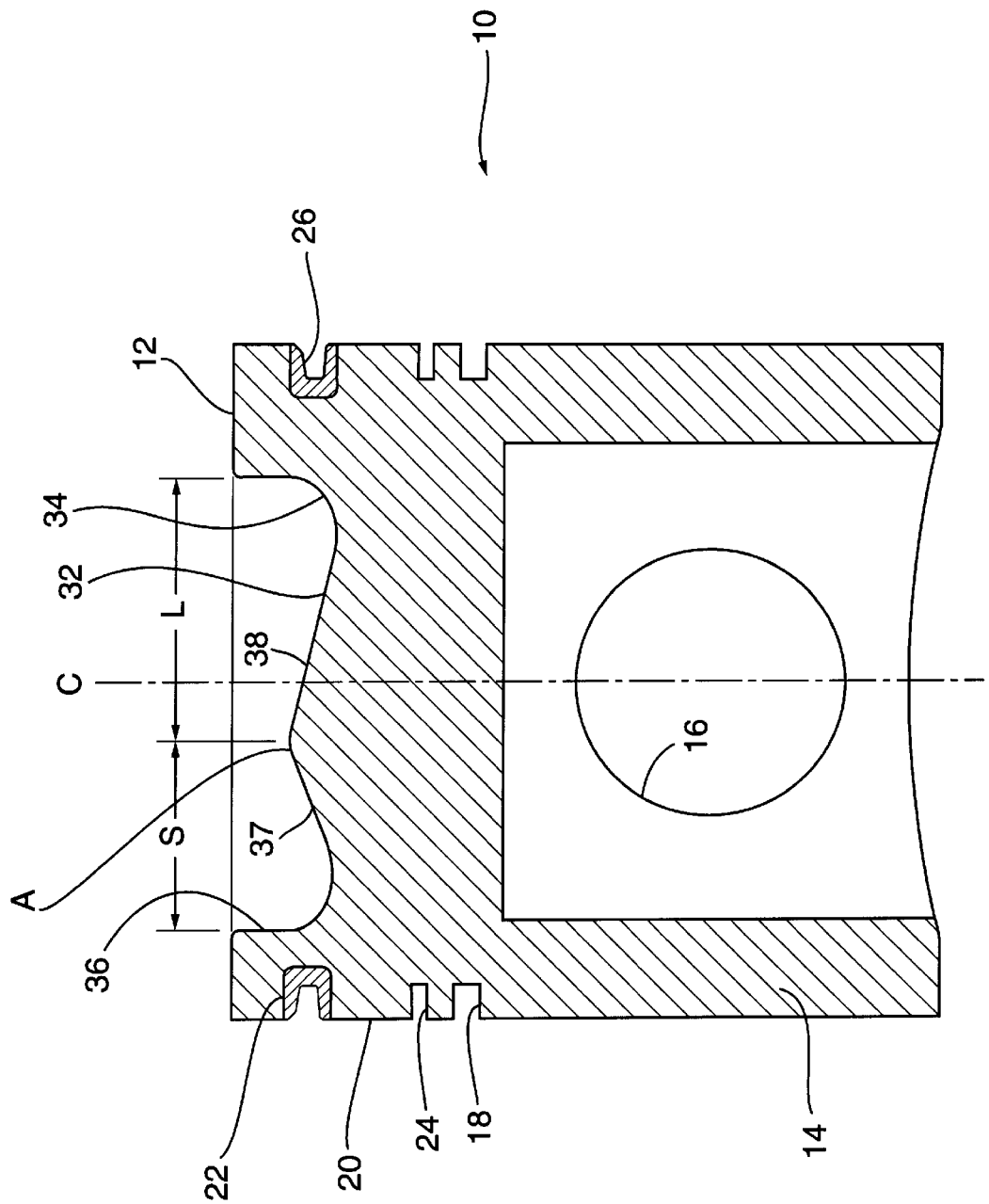
FIG. 3 is a sectional side view taken generally along line III—III of FIG. 2.

Referring now to the drawings, wherein like numerals designate like parts, in FIGS. 1–3 there is shown a piston 10 having a generally cylindrical body comprising a piston head 12 forming a top end of the piston 10 and a skirt 14 forming a lower portion of the piston 10. Pin bores 16 are disposed through the skirt 14 which bear against an appropriate pin supporting the piston 10 on a connecting rod (not shown). A pair of ring grooves 18, 20 are formed circumferentially around a side 24 of the piston 10, as shown in FIGS. 1 and 3. Near a top of the piston 10, above the ring grooves 18, 20, the piston 10 preferably includes a circumferential recess 22 which is sized to accommodate a grooved ring insert 26, illustrated in FIG. 3. The piston 10 has a central axis C. The ring grooves 18, 22 and ring insert 26 are sized to accommodate piston rings 28 (see FIG. 4).

The piston 10 includes a recessed piston bowl 30 which is formed by a surface of the piston head 12. The piston bowl 30 has a raised inner portion 32 surrounded by a peripherally-concave outer portion 34 that is bounded by a generally inwardly-facing peripheral wall 36. The inner portion 32 of the bowl 30 has an apex A which is its peak or high point. As shown in FIGS. 1–4, the bowl apex A is offset from the central axis C. Referring to the sectional view of FIG. 3, the peripheral wall 36 is shown as having a generally vertical profile, however a piston bowl according to the invention could have a peripheral wall with some other suitable profile (not shown), such as an undercut toroidal profile, an angled profile, etc.

The piston 10 is preferably made of aluminum, but may also be made of another suitable metal, such as forged steel or ductile iron. The ring insert 24 is made of a metal that is more durable metal than the metal of which the body of the piston 10 is formed. For example, where the body of the piston 10 is formed of aluminum, the grooved ring insert 24 may be formed of iron or steel.

The piston 10 is especially adapted for use in an engine having offset-mounted fuel injectors. For example, referring to FIG. 4, the piston 10 is illustrated as assembled in an engine having a cylinder wall 40 and a cylinder head 42 mounted across a top of the cylinder wall 40 to define a combustion chamber volume over the piston 10. In the embodiment illustrated, the piston 10 moves so close to the cylinder head during top-dead-center compression (to reach a high compression ratio) that the combustion chamber is defined essentially by the piston bowl 30 at that point, and is referred to in the drawings as such. The engine also includes an offset fuel injector 50 mounted to extend through the cylinder head 42 for injecting fuel into the piston bowl 30. Particularly, the fuel injector 50 is generally elongate in shape and has an end with an injector tip 52 that protrudes into the piston bowl 30.

Figure 5:
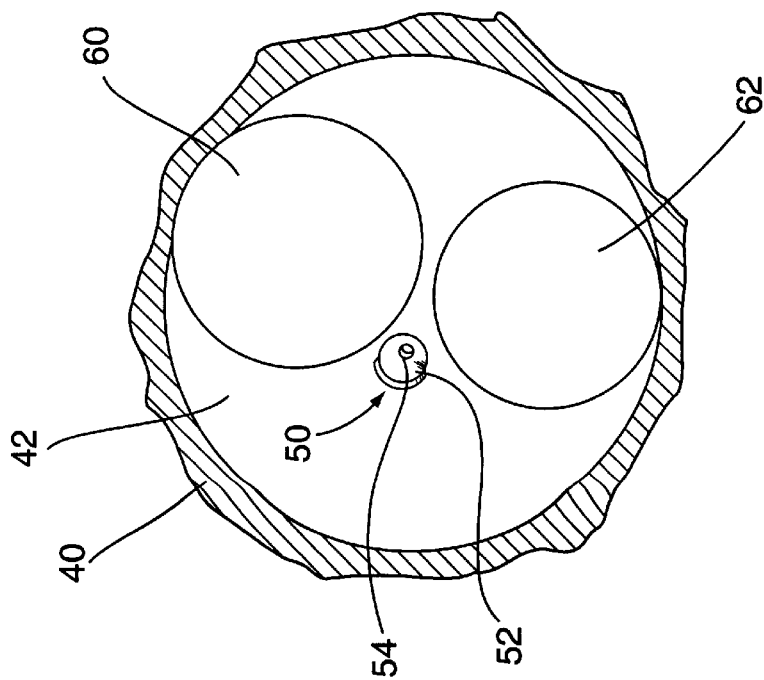
FIG. 5 is a sectional view taken generally along line V—V of FIG. 4 looking upwardly from the piston toward the cylinder head.

As shown in FIG. 5, the exemplary engine is of a type having two valves per cylinder, i.e., an intake valve 60 and an exhaust valve 62. Such an engine requires that the injector 50 be mounted in a position which is offset from the central axis C because the valves 60, 62 occupy much of the center area of the cylinder head 42, leaving insufficient space or structure to permit mounting of the injector 50 centrally relative to the piston.

Figure 4:
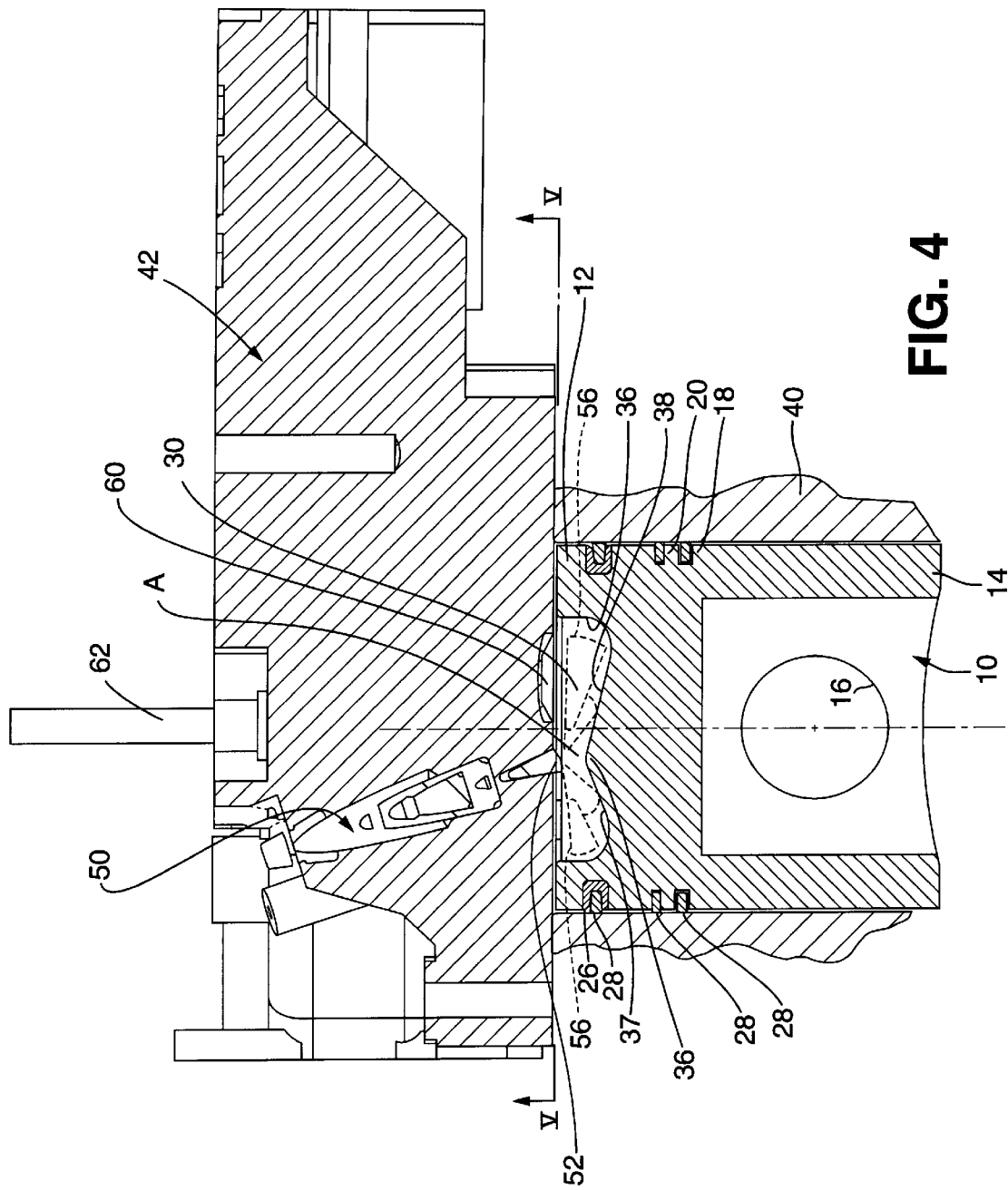
FIG. 4 is a fragmentary sectional side view of an engine illustrating a piston in an engine cylinder in compression, spray plumes being indicated by dashed lines.

The injector tip 52 has a plurality of nozzle holes 54 through which fuel is injected into the piston bowl 30 during a compression stroke, as illustrated in FIG. 4. Spray plumes are formed by respective fuel streams exiting from each of these nozzle holes 54 during injection, and these spray plumes generally occur within the dashed-line regions 56 indicated in FIGS. 4 and 6.

According to the invention, the piston bowl has a shape and position which provide optimal space to accommodate spray plumes from fuel injected by an offset fuel injector. More specifically, the bowl has an advantageous non-annular or non-circular shape which is generally offset in position. The improved shape provides greater available distance to accommodate plume length within the bowl volume, aiding to achieve complete fuel atomization while avoiding impingement. The invention thereby results in improved emissions.

Referring back to FIGS. 1–3, the bowl 30 according to the invention is generally roundish in shape, but has a non-annular or non-circular overall contour. For example, the illustrated bowl 30 has an outer edge or outline formed by the peripheral wall 36 which is generally egg-shaped. Cross-sections taken through the piston head 12 parallel to the view of FIG. 1 reveal non-annular bowl dimensions. Embodiments of the invention are possible wherein the non-annular piston bowl 30 is asymmetrical. Additionally, the bowl 30 is offset relative to the axis C of the piston 10.

In order to avoid spray plume impingement on the apex A of the bowl 30, the invention provides that apex A is preferably positioned non-centrally to relative to the peripheral wall 36 of the bowl 30. This enables the apex A of the bowl 30 to be located directly under the injector tip 52, as shown in FIG. 4, which is desirable in order to avoid impingement against the apex A because the plumes are directed generally radially outwardly and downwardly from the tip, but not directly downwardly, as indicated by dashed line regions 56 in FIGS. 4 and 6. As also illustrated, the nozzle holes 54 are preferably oriented to direct the respective spray plumes 56 toward similar vertical heights on the inwardly-facing outer wall 36 of the bowl 30 for maximal length of the respective plumes 56.

Because the apex A of the bowl 30 is offset relative to the peripheral wall 36 of the bowl 30, the bowl 30 has a "short" side 37 and an opposite "long" side 38. The apex A is located closest to the wall 36 at the short side 37. In the illustrated embodiment, a distance S between the apex A and the wall 36 at the short side 37 is about three-fourths of a distance L between the apex A and the wall 36 at the long side 38, however, other relative dimensions are also possible which result in an appropriate location of the apex A relative to the injector tip 52 for a particular engine design.

Due to the offset location of the bowl 30, the wall 36 extends closer to the side 24 of the piston 10 at the short side 37 of the bowl 30 than at the long side 38.

At the short side 37, the bowl contour is designed to be as close to the side 24 of the piston 10 as possible, within acceptable material design limits. This maximizes the possible spray plume length at the short side 37. In determining the proximity of the bowl 30 to the side of the piston 10, all of the shape features of the piston 10 must be considered, such as the circumferential recess 22 to accommodate the ring insert 26. For example, as is apparent in FIG. 3, increasing the depth of the recess 22 reduces the amount of piston material beside the bowl 30, thereby requiring a greater distance between the bowl 30 and the side of the piston. At the regions of the bowl 30 away from the short side 37, the wall 36 of the bowl 30 does not as closely approach the side of the piston 10. It is noted that various embodiments are possible wherein ring inserts (not shown) may be provided in recesses in the piston 10 to form the ring groove 18 and/or 20.

It is noted that although the surface forming the bowl volume is not uniformly annular, portions of the surface of bowl 30 may have a circularly arcuate contour. Thus, in keeping with the invention, a portion of the bowl 30 at the short side 37 may be shaped with a circular or radial curvature similar to a conventional circular piston bowl. However, a remainder of the bowl 30 is shaped with an increasing distance of the wall 36 away from the apex A to accommodate greater spray plume length.

The raised inner portion 32 of the of the bowl 30 slopes downwardly away from the apex A, tangentially meeting the concave curvature of the outer portion 34. The slope of the inner portion 32 is steeper on the short side 37 than on the long side 38. The illustrated peripheral outer wall 36 is generally vertical, but also meets the concave bottom of the outer portion 34 in a tangential manner so that the bowl 30 is preferably smooth.

Figure 6:
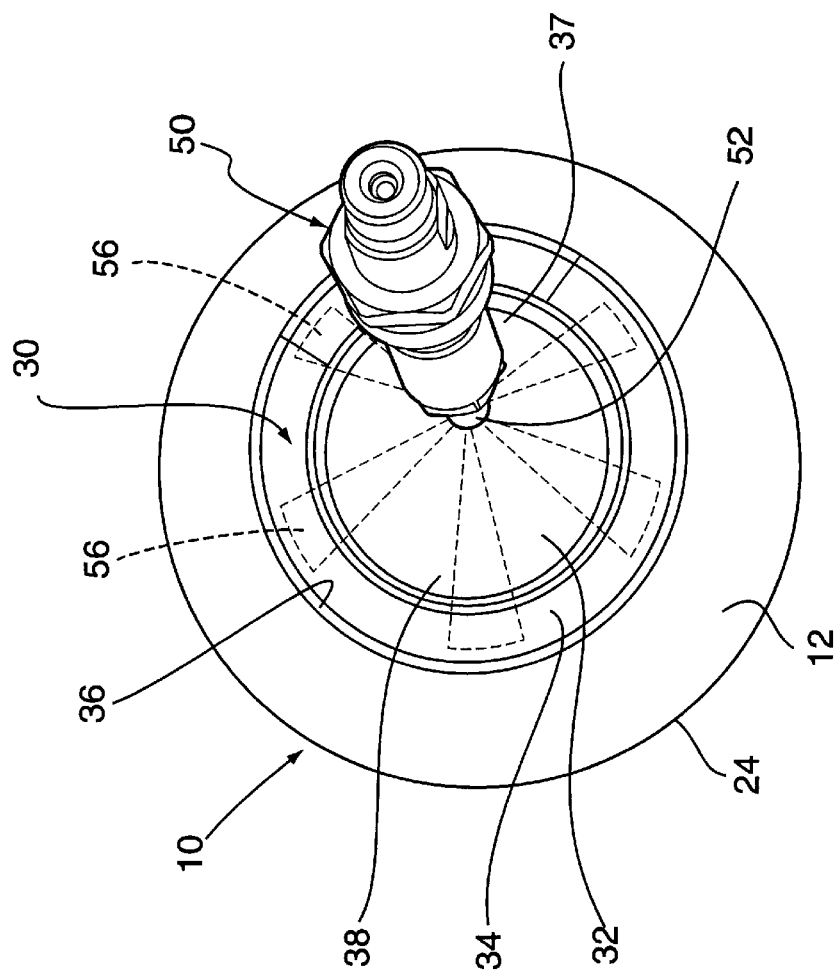
FIG. 6 is a plan view of the piston and fuel injector as relatively positioned when mounted in an engine, with spray plumes indicated in dashed lines.

For optimally utilizing the available bowl volume, the injector 50 is configured to simultaneously provide a plurality of spray plumes which are respectively different lengths so the plumes are generally matched in shape to the volume of the bowl 30 (see FIG. 6). This is achieved by providing less fueling through nozzle holes 54 directed toward the short side 37 of the bowl 30. In an engine wherein the injector 50 is mounted at an angle, as illustrated in FIGS. 4 and 6, the nozzle holes 54 are drilled at respectively different angles to achieve proper aim of the injected fuel. Accordingly, because an axis of the injector 50 is directed more toward the long side 38 than the short side 37, the nozzle holes 54 which are directed toward the short side are drilled at a more severe angle. The fuel traveling through these short side nozzle holes takes a sharper "turn" and experiences greater resistance, thereby reducing the amount of fueling toward the short side 37 of the bowl 30. This results in respectively shorter spray plumes from the injector 50 toward the short side 37 of the bowl 30 than toward the long side 38.

In addition, or alternatively, the nozzle holes 54 in the injector tip 52 may be differently sized to achieve an optimal amount of fueling through each respective hole 54, thereby maximizing the length of the respectively resulting plumes without impingement. In particular, the nozzle holes 54 directing plumes 56 toward the short side 37 of the bowl 30 provide the least amount of fueling and result in the shortest spray plume lengths, because less distance is available between the injector tip 52 and the short side 37 of the bowl 30. This causes the plurality of spray plumes 56 to effectively to match the shape bowl 30.

As described herein, a "generally cylindrical piston" can include a piston which is not precisely cylindrical. For example, it is known to provide a piston which has a slightly smaller diameter in a direction through the pin bores, resulting in the slight oval shape. Accordingly, a generally piston constructed in accordance with teachings of invention may have such an oval cross section.

While the invention is described herein in connection with certain preferred embodiments, there is no intent to limit it to those embodiments. On the contrary, it is recognized that various changes and modifications to the described embodiments will be apparent to those skilled in the art, and that such changes and modifications may be made without departing from the spirit and scope of the present invention. Accordingly, the intent is to cover all alternatives, modifications, and equivalents included within the spirit and scope of the invention as defined by the appended claims.

What is claimed is:

1. A piston for an internal combustion engine, the piston having a generally cylindrical body with a piston head formed at an end thereof, a surface of the piston head forming a piston bowl which is offset from a central axis of the piston, wherein an outer portion of the bowl includes an outer peripheral wall defining an outer edge of the bowl, the peripheral wall being generally egg-shaped.

2. The piston according to claim 1, wherein said bowl has a raised inner portion and a concave outer portion which peripherally surrounds the inner portion.

3. The piston according to claim 1, wherein said bowl has a short side and opposite long side, the short side being positioned closer to a side of the piston than the long side.

4. The piston according to claim 3, wherein the raised inner portion has an apex located at a peak thereof, the apex being positioned closer to an edge of said bowl at said short side than said long side.

5. The piston according to claim 4, wherein a distance between the apex and said outer peripheral wall at said short side is about three-fourths of a distance between the apex and the peripheral wall at said long side.

6. A piston for an internal combustion engine comprising a generally cylindrical body aligned on a central axis and a piston head formed at one end of the body, the piston head having a piston bowl formed therein, the piston bowl having a surface including a generally concave portion surrounding a raised inner portion, the raised inner portion peaking at an apex which is offset from a center of the bowl, and wherein the bowl has an outer periphery which is generally egg-shaped.

7. A piston according to claim 6, wherein said surface of said piston bowl is non-annular as intersected by a plane perpendicular to said central axis.

8. A piston according to claim 6, wherein said piston bowl includes an outer periphery, the bowl having a short side and an opposite long side, said apex being positioned closer the periphery at the short side than the long side.

9. A piston according to claim 8, wherein said periphery is located closer to a side of the piston at said short side than at said long side.

10. A piston according to claim 9, wherein a distance between the apex and said periphery at said short side is about three-fourths of a distance between the apex and said periphery at said long side.

11. A piston according to claim 8, wherein the short side of the bowl is positioned closer to a side of the piston than the long side of the bowl.

12. An internal combustion engine comprising:

at least one cylinder;

a generally cylindrical piston movably mounted within said cylinder, the piston having a central axis; and a fuel injector, the injector being mounted offset from the central axis;

wherein the piston includes a piston head with a recessed piston bowl formed therein, the piston bowl being offset from said central axis and wherein said bowl has a raised inner portion and a concave outer portion which peripherally surrounds the inner portion, wherein said outer portion includes an outer peripheral wall defining an outer edge of the bowl, and wherein said bowl has a short side and opposite long side, the peripheral wall being positioned closer to a side of the piston at the short side than at the long side, and wherein the peripheral wall is generally egg-shaped.

13. An engine according to claim 12, where the raised inner portion has an apex positioned closer to the peripheral wall of said bowl at said short side than said long side.

14. An engine according to claim 12, wherein the raised inner portion has an apex located at a peak thereof, and wherein a distance between the apex and said outer peripheral wall at said short side is about three-fourths of a distance between the apex and the peripheral wall at said long side.

15. An engine according to claim 12, wherein the raised inner portion has an apex located at a peak thereof, the apex being located offset from said central axis of said piston.

16. An engine according to claim 12, wherein the raised inner portion has an apex located at a peak thereof, the apex being aligned generally under a tip of said injector.

17. An engine according to claim 16, wherein said injector has tip with a plurality of nozzle holes, each respective nozzle hole directing a stream fuel into the cylinder which creates a spray plume, the nozzles being disposed at respective angles such that the plumes are directed toward similar vertical heights in said concave portion of said bowl, each nozzle being respectively sized so that the resulting spray plume has a length which does not extend to a surface of said bowl.

18. An engine according to claim 12, wherein said injector has tip with a plurality of nozzle holes, each respective nozzle hole directing a stream fuel into the cylinder which creates a spray plume, the nozzles being disposed at respective angles such that the plumes are directed toward similar vertical heights in said bowl.

* * * * *